(12) United States Patent
Kim

(10) Patent No.: US 12,472,788 B2
(45) Date of Patent: Nov. 18, 2025

(54) VEHICLE SUSPENSION

(71) Applicant: HYUNDAI MOBIS CO., LTD., Seoul (KR)

(72) Inventor: Young Ha Kim, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/071,543

(22) Filed: Mar. 5, 2025

(65) Prior Publication Data

US 2025/0303808 A1    Oct. 2, 2025

(30) Foreign Application Priority Data

Apr. 1, 2024 (KR) .......................... 10-2024-0044338

(51) Int. Cl.
*B60G 11/12* (2006.01)
*B60G 11/04* (2006.01)

(52) U.S. Cl.
CPC .............. *B60G 11/12* (2013.01); *B60G 11/04* (2013.01); *B60G 2202/112* (2013.01); *B60G 2204/121* (2013.01); *B60G 2204/41* (2013.01); *B60G 2206/428* (2013.01)

(58) Field of Classification Search
CPC ... B60G 11/12; B60G 11/04; B60G 2202/112; B60G 2204/121; B60G 2204/41; B60G 2206/428
See application file for complete search history.

(56) References Cited

U.S. PATENT DOCUMENTS

| | | | |
|---|---|---|---|
| 6,086,077 A * | 7/2000 | Stuart | B60G 11/465 280/124.157 |
| 6,247,689 B1 * | 6/2001 | Haesle | F16F 1/28 267/260 |
| 6,273,441 B1 * | 8/2001 | Neavitt | F16F 1/26 267/48 |
| 10,239,372 B2 * | 3/2019 | Bilancio | B60G 5/04 |
| 2010/0171251 A1 * | 7/2010 | Matsuda | B63B 25/008 267/271 |
| 2011/0001300 A1 * | 1/2011 | Juriga | B60G 11/113 280/124.116 |
| 2014/0035248 A1 * | 2/2014 | Dilworth | B60G 11/04 280/124.17 |
| 2019/0111749 A1 * | 4/2019 | Simon | B60G 11/42 |
| 2019/0168560 A1 * | 6/2019 | David | B60G 11/62 |
| 2020/0262264 A1 * | 8/2020 | Berlingieri | B60G 11/10 |
| 2023/0020086 A1 * | 1/2023 | Song | F16F 1/26 |
| 2025/0001825 A1 * | 1/2025 | Krueger | B60G 17/017 |

* cited by examiner

*Primary Examiner* — Toan C To
(74) *Attorney, Agent, or Firm* — NSIP Law

(57) ABSTRACT

A vehicle suspension including a leaf spring, a shackle configured to support the leaf spring on a frame, a lever shackle configured to be rotated by being linked with the shackle, and an elastic member configured to be pressurized by a rotational displacement of the lever shackle.

10 Claims, 6 Drawing Sheets

VEHICLE SUSPENSION

CROSS REFERENCE TO RELATED APPLICATION

The present application claims the benefit under 35 USC § 119(a) of Korean Patent Application No. 10-2024-0044338 filed on Apr. 1, 2024, the entire contents of which is incorporated herein for all purposes.

BACKGROUND OF THE INVENTION

1. Field of the Invention

The present disclosure relates to a technology for a vehicle suspension using a leaf spring.

2. Description of the Related Art

A vehicle suspension improves ride comfort by supporting the ascending and descending of a wheel relative to a frame between the wheel and the frame using a spring and a damper.

The existing suspension using a leaf spring has a configuration in which an axle is connected to an intermediate portion of the leaf spring through a clamp in a state in which spring eyes, which are both ends of the leaf spring, are mounted on a frame, thereby supporting wheels installed at both ends of the axle.

Typically, one of the spring eyes at the both ends of the leaf spring is supported on the frame to be rotated simply, whereas the other thereof is capable of being rotated and moved in a front-rear direction to be supported on the frame via a shackle so as to accommodate a span change of the leaf spring.

When a stiffness of the leaf spring is set based on when loading, a height of a vehicle equipped with the leaf spring may be maintained appropriately when loading. However, when empty, the vehicle height is excessively high and the ride comfort is deteriorated due to an excessively high spring stiffness. When the stiffness of the leaf spring is set based on when empty, the smooth ride comfort can be secured, whereas when loading, it is difficult to secure a sufficient vehicle height.

The foregoing is intended merely to aid in the understanding of the background of the present disclosure, and is not intended to mean that the present disclosure falls within the purview of the related art that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a vehicle suspension including a leaf spring, a shackle configured to support the leaf spring on a frame, a lever shackle configured to be rotated by being linked with the shackle, and an elastic member configured to be pressurized by a rotational displacement of the lever shackle.

The lever shackle may include a shackle linkage configured to connect a spring eye of the leaf spring to a shackle mounting bracket of the frame and a pressurizing lever configured to extend from the shackle linkage and pressurize the elastic member.

An eye through shaft may be rotatably inserted into the spring eye of the leaf spring, a first side of the eye through shaft may be supported on the shackle, and a second side of the eye through shaft may be supported on the shackle linkage of the lever shackle.

The vehicle suspension may further include a bracket through shaft, the bracket through shaft is configured to pass through the shackle mounting bracket, and the eye through shaft are integrally provided on the shackle in parallel and the shackle linkage of the lever shackle may be rotatably inserted into the bracket through shaft and the eye through shaft.

The elastic member may be installed at a position where the elastic member is further pressurized by the pressurizing lever as a span of the leaf spring becomes shorter.

The elastic member may be installed at a position where the elastic member is compressed by the pressurizing lever as a span of the leaf spring becomes shorter to pressurize the elastic member The elastic member may be inserted into and fixed to a spring mounting cup installed at a spring support bracket fixed to the frame.

The pressurizing lever of the lever shackle may be configured to be bent and extended in a direction perpendicular towards the shackle linkage and, when the shackle linkage is rotated about the bracket through shaft, an end portion of the pressurizing lever may be disposed to pressurize the elastic member inserted into the spring mounting cup.

The lever shackle may be installed on a rear side of the leaf spring of a vehicle including the vehicle suspension, the shackle linkage of the lever shackle may be disposed to be long in a vertical direction based on the bracket through shaft, and the pressurizing lever extends from an upper end of the shackle linkage toward a rear side of the vehicle, and the elastic member may be fixed to an upper rear side of the bracket through shaft of the vehicle by the spring support bracket and the spring mounting cup.

The lever shackle may be configured to form a movable gap between the lever shackle and the elastic member when a vehicle including the vehicle suspension in an empty state and to pressurize the elastic member as the movable gap is removed as the vehicle approaches a loaded state.

The elastic member may have a first spring stiffness that is greater than a second spring stiffness of the leaf spring.

Figure 1:
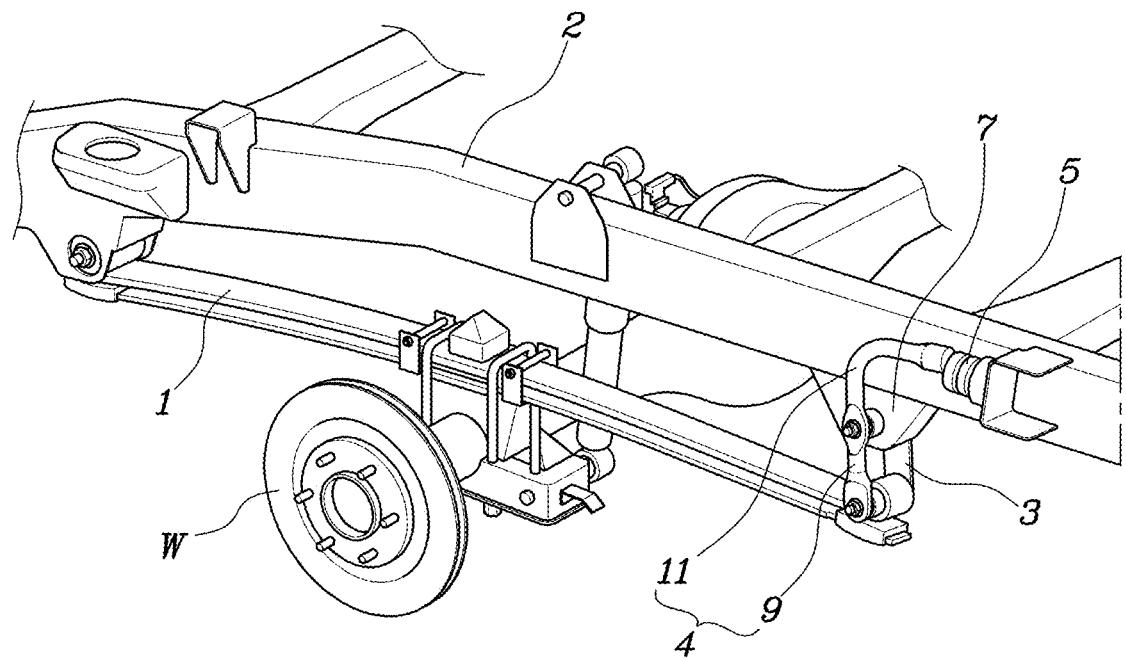
FIG. 1 is a diagram illustrating a vehicle suspension according to the present disclosure.
Figure 2:
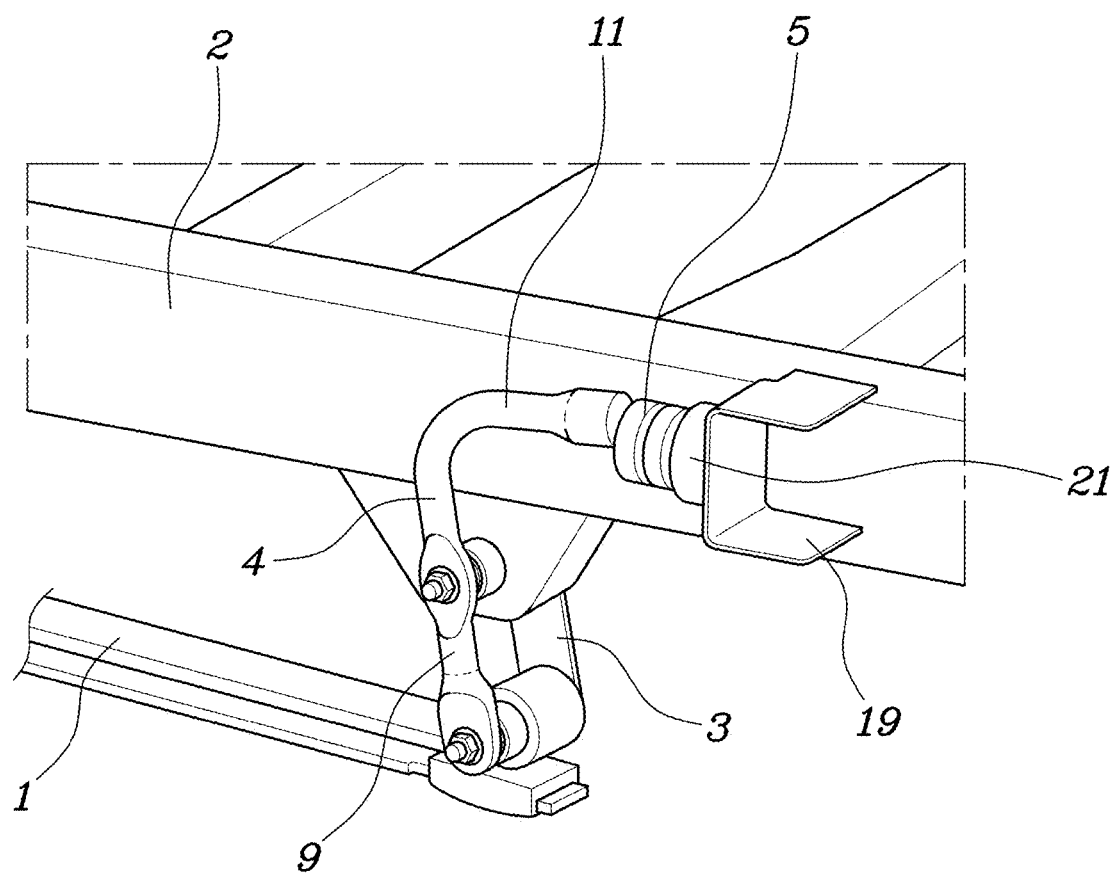
FIG. 2 is a detailed diagram illustrating a main portion of FIG. 1.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Accordingly, the present disclosure has been made keeping in mind the above problems occurring in the related art, and the present disclosure is intended to provide a vehicle suspension that can provide a dual spring stiffness when empty and when loading in a vehicle equipped with a leaf spring so that smooth ride comfort can be secured when empty and a sufficient vehicle height can be secured when loading.

Referring to FIGS. 1 to 6, an embodiment of a vehicle suspension of the present disclosure includes a leaf spring 1, a shackle 3 supporting the leaf spring 1 to a frame 2, a lever shackle 4 installed to be rotated by being linked with the shackle 3, and an elastic member 5 installed to be pressurized by a rotational displacement of the lever shackle 4.

That is, the present disclosure is configured such that the lever shackle 4 is rotated by being linked with the shackle 3 according to the span change of the leaf spring 1 due to the ascending and descending of the wheel W, thereby providing an additional spring stiffness by the elastic member 5.

The lever shackle 4 is installed to form a movable gap G between the lever shackle 4 and the elastic member 5 when empty and to pressurize the elastic member 5 while removing the movable gap G when loading.

In addition, the elastic member 5 has a spring stiffness that is greater than a spring stiffness of the leaf spring 1.

In addition, the suspension of the present disclosure provides only the spring stiffness due to an elastic deformation of the leaf spring 1 itself to the wheel W when empty and provides the spring stiffness of the elastic member 5 to the wheel W when loading.

Here, when the spring stiffness of the leaf spring 1 of the suspension of the present disclosure is formed at a level capable of improving ride comfort of the vehicle when empty and the spring stiffness of the elastic member 5 is formed at a level capable of forming an appropriate vehicle height when loading, the suspension of the present disclosure forms soft ride comfort of the vehicle when empty and forms an appropriate vehicle height when loading so that dual suspension characteristics suitable for a condition of the vehicle depending on whether the vehicle is loaded can be provided.

For reference, "when empty" here can be understood as corresponding to an "empty state" of Article 2 of the Regulations of Automobile Safety Standards so that "when empty" can be regarded as a state in which no cargo is loaded onto the vehicle, and "when loading" can be understood as corresponding to a "loaded state" of the same regulations so that "when loading" can be regarded as a state in which a maximum amount of cargo is loaded onto the vehicle. In an example, "when loading" may refer to the addition of weight to the vehicle as the vehicle approaches the maximum amount of cargo.

In the present embodiment, the lever shackle 4 includes a shackle linkage 9 connecting a spring eye of the leaf spring 1 and a shackle mounting bracket 7 of the frame 2, and a pressurizing lever 11 formed to extending from the shackle linkage 9 to pressurize the elastic member 5.

That is, when a change occurs in the span of the leaf spring 1, the shackle linkage 9 serves to generate a rotational displacement together with the shackle 3, and the pressurizing lever 11 uses the rotational displacement generated by the shackle linkage 9 to remove the movable gap G and pressurize the elastic member 5 so that the spring stiffness by the elastic member 5 is applied to the wheel W.

An eye through shaft 13 is rotatably inserted into the spring eye of the leaf spring 1, one side of the eye through shaft 13 is supported on the shackle 3, and the other side of the eye through shaft 13 is supported on the shackle linkage 9 of the lever shackle 4.

That is, in the present embodiment, the shackle 3 is provided only on one side of the leaf spring 1, and the other side is configured such that the shackle linkage 9 of the lever shackle 4 performs the role of the shackle 3.

Of course, like the related art, it is also possible that, in a state in which the shackle 3 is provided on both sides of the leaf spring 1, the shackle linkage 9 of the lever shackle 4 is installed in a state of overlapping the shackle 3 on one side.

In the present embodiment, a bracket through shaft 15, which passes through the shackle mounting bracket 7, and the eye through shaft 13 are integrally provided on the shackle 3 in parallel, and the shackle linkage 9 of the lever shackle 4 is rotatably inserted into the bracket through shaft 15 and the eye through shaft 13.

Thus, the assembly of the shackle 3, the lever shackle 4, and the leaf spring 1 may be accomplished very simply so that excellent assembly workability can be secured.

Figure 3:
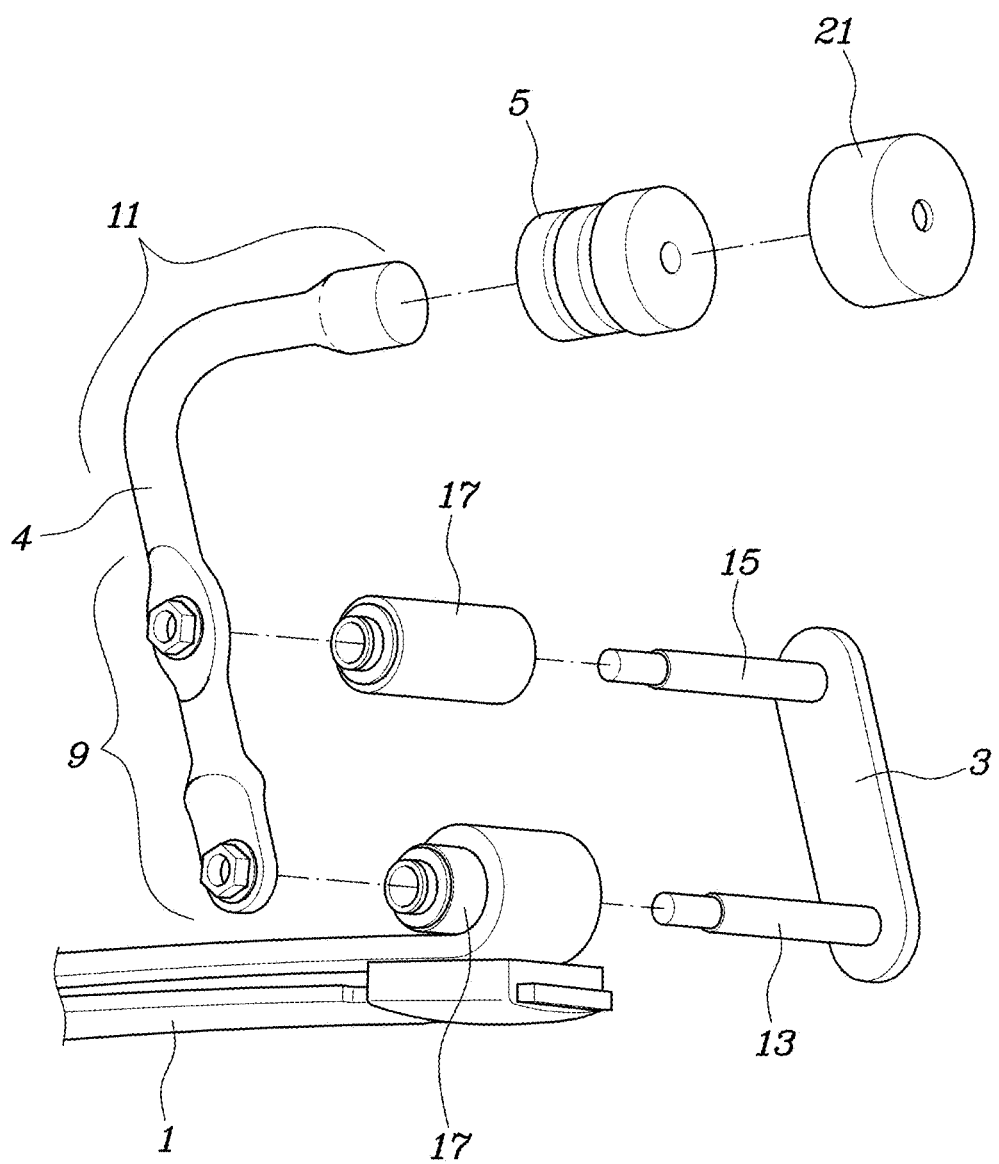
FIG. 3 is an exploded diagram illustrating main components of FIG. 2.

For reference, referring to FIG. 3, a mounting bush 17 is coupled to the bracket through shaft 15 and the eye through shaft 13 to enable a smoother and quieter rotation.

As the span of the leaf spring 1 becomes shorter, the elastic member 5 is installed at a position where the elastic member 5 is further compressed (i.e., further pressurized) by the pressurizing lever 11. That is, the elastic member 5 may be further pressurized by the compression caused by the pressurizing member 11.

Figure 5:
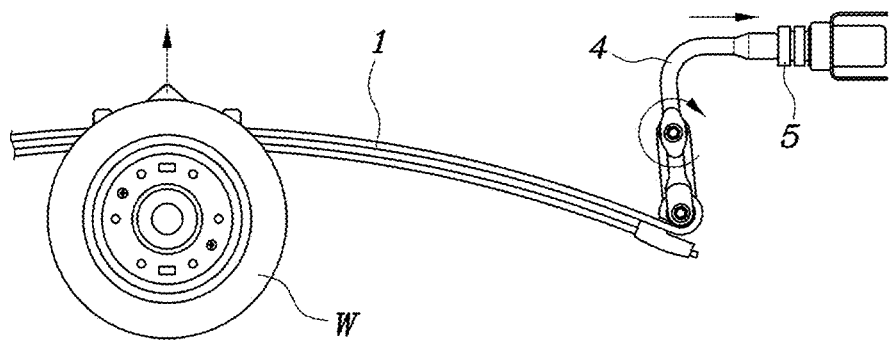
FIG. 5 is an exemplary diagram illustrating the operation of the vehicle suspension of the present disclosure when loading.

That is, as shown in FIG. 5, since a left spring eye of the leaf spring 1 is fixed in a state of being rotated only, when the wheel W moves upward relative to the frame 2 of the vehicle due to a live load, the leaf spring 1 is deformed into an arc shape and thus the span is shortened. Thus, the shackle 3 and the lever shackle 4 are rotated in a clockwise direction, and as the lever shackle 4 is rotated, the pressurizing lever 11 of the lever shackle 4 removes the movable gap G and pressurizes the elastic member 5.

Figure 4:
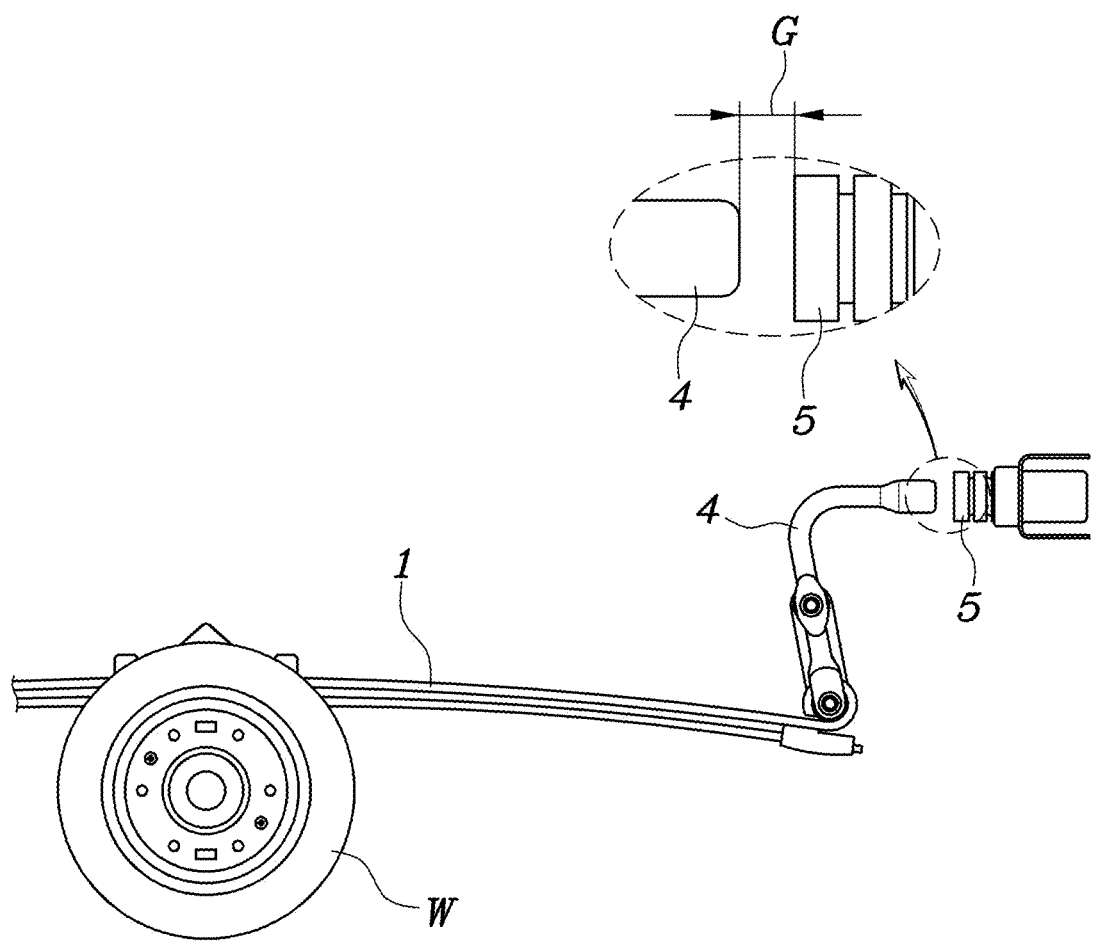
FIG. 4 is an exemplary diagram illustrating an operation of the vehicle suspension of the present disclosure when empty.
Figure 6:
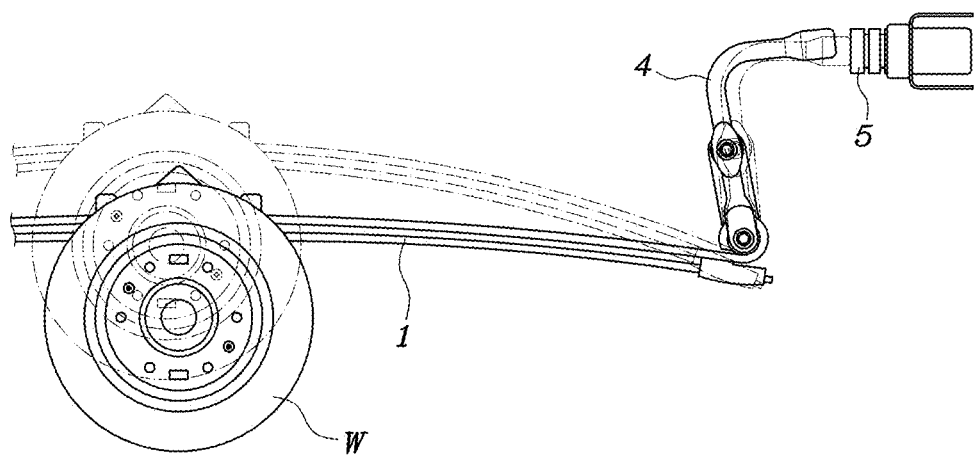
FIG. 6 is a diagram overlapping and comparing FIGS. 4 and 5.

For reference, FIG. 6 shows a comparison when empty in FIG. 4 with when loading in FIG. 5 and indicates the state of when loading as a dotted line.

In the present embodiment, the elastic member 5 is inserted into and fixed to a spring mounting cup 21 installed on a spring support bracket 19 fixed to the frame 2.

In addition, the pressurizing lever 11 of the lever shackle 4 is bent and extended in a direction perpendicular to the shackle linkage 9, an end portion of the pressurizing lever 11 pressurizes the elastic member 5 inserted into the spring mounting cup 21 when the shackle linkage 9 is rotated about the bracket through shaft 15.

That is, in the present embodiment, the lever shackle 4 is installed on a rear side of the leaf spring 1 of the vehicle, the shackle linkage 9 of the lever shackle 4 is disposed to extend vertically based on the bracket through shaft 15, the pressurizing lever 11 extends from an upper end of the shackle linkage 9 toward a rear side of the vehicle, and the elastic member 5 is fixed to an upper rear side of the bracket through shaft 15 by the spring support bracket 19 and the spring mounting cup 21.

Here, the elastic member 5 may be made of a material such as urethane.

Figure 7:
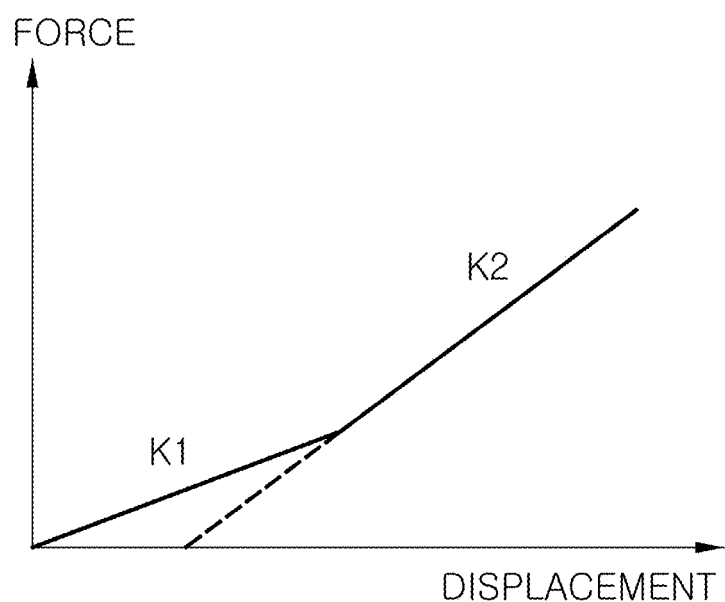
FIG. 7 is a graph for describing a spring stiffness according to a displacement of the vehicle suspension of the present disclosure.

As described above, the elastic member 5 provides a spring stiffness that is greater than the spring stiffness of the leaf spring 1, and thus as a displacement of the wheel W moving upward toward the frame 2 increases, a spring stiffness $K1$ of the leaf spring 1 gradually increases as shown in FIG. 7. When the lever shackle 4 starts to pressurize the elastic member 5, a spring stiffness $K2$ of the elastic member 5 acts, and thus excellent ride comfort can be provided in a region where the spring stiffness $K1$ of the leaf spring 1 acts, and an appropriate vehicle height can be formed despite the live load in a region where the spring stiffness $K2$ of the elastic member 5 acts.

According to the present disclosure, a vehicle suspension can provide a dual spring stiffness when empty and when loading in a vehicle equipped with a leaf spring so that smooth ride comfort can be secured when empty and a sufficient vehicle height can be secured when loading.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle suspension, comprising:
   a leaf spring;
   a shackle configured to support the leaf spring on a frame;
   a lever shackle configured to be rotated by being linked with the shackle; and
   an elastic member configured to be pressurized by a rotational displacement of the lever shackle,
   wherein the lever shackle comprises:

a shackle linkage configured to connect a spring eye of the leaf spring to a shackle mounting bracket of the frame, and a pressurizing lever configured to extend from the shackle linkage and pressurize the elastic member.

2. The vehicle suspension of claim 1, wherein an eye through shaft is rotatably inserted into the spring eye of the leaf spring, wherein a first side of the eye through shaft is supported on the shackle, and wherein a second side of the eye through shaft is supported on the shackle linkage of the lever shackle.

3. The vehicle suspension of claim 2, further comprising:

a bracket through shaft, the bracket through shaft is configured to pass through the shackle mounting bracket, and the eye through shaft are integrally provided on the shackle in parallel, and wherein the shackle linkage of the lever shackle is rotatably inserted into the bracket through shaft and the eye through shaft.

4. The vehicle suspension of claim 3, wherein the elastic member is installed at a position where the elastic member is further pressurized by the pressurizing lever as a span of the leaf spring becomes shorter.

5. The vehicle suspension of claim 3, wherein the elastic member is installed at a position where the elastic member is compressed by the pressurizing lever as a span of the leaf spring becomes shorter to pressurize the elastic member.

6. The vehicle suspension of claim 3, wherein the elastic member is inserted into and fixed to a spring mounting cup installed at a spring support bracket fixed to the frame.

7. The vehicle suspension of claim 6, wherein the pressurizing lever of the lever shackle is configured to be bent and extended in a direction perpendicular towards the shackle linkage, and wherein, when the shackle linkage is rotated about the bracket through shaft, an end portion of the pressurizing lever is disposed to pressurize the elastic member inserted into the spring mounting cup.

8. The vehicle suspension of claim 7, wherein the lever shackle is installed on a rear side of the leaf spring of a vehicle comprising the vehicle suspension, wherein the shackle linkage of the lever shackle is disposed to be long in a vertical direction based on the bracket through shaft, and the pressurizing lever extends from an upper end of the shackle linkage toward a rear side of the vehicle; and wherein the elastic member is fixed to an upper rear side of the bracket through shaft of the vehicle by the spring support bracket and the spring mounting cup.

9. The vehicle suspension of claim 1, wherein the lever shackle is configured to form a movable gap between the lever shackle and the elastic member when a vehicle comprising the vehicle suspension in an empty state and to pressurize the elastic member as the movable gap is removed as the vehicle approaches a loaded state.

10. The vehicle suspension of claim 1, wherein the elastic member has a first spring stiffness that is greater than a second spring stiffness of the leaf spring.

* * * * *